No. 631,238. Patented Aug. 15, 1899.
J. E. TYLER.
MOTOR APPARATUS.
(Application filed June 6, 1898.)
(No Model.) 2 Sheets—Sheet 2.
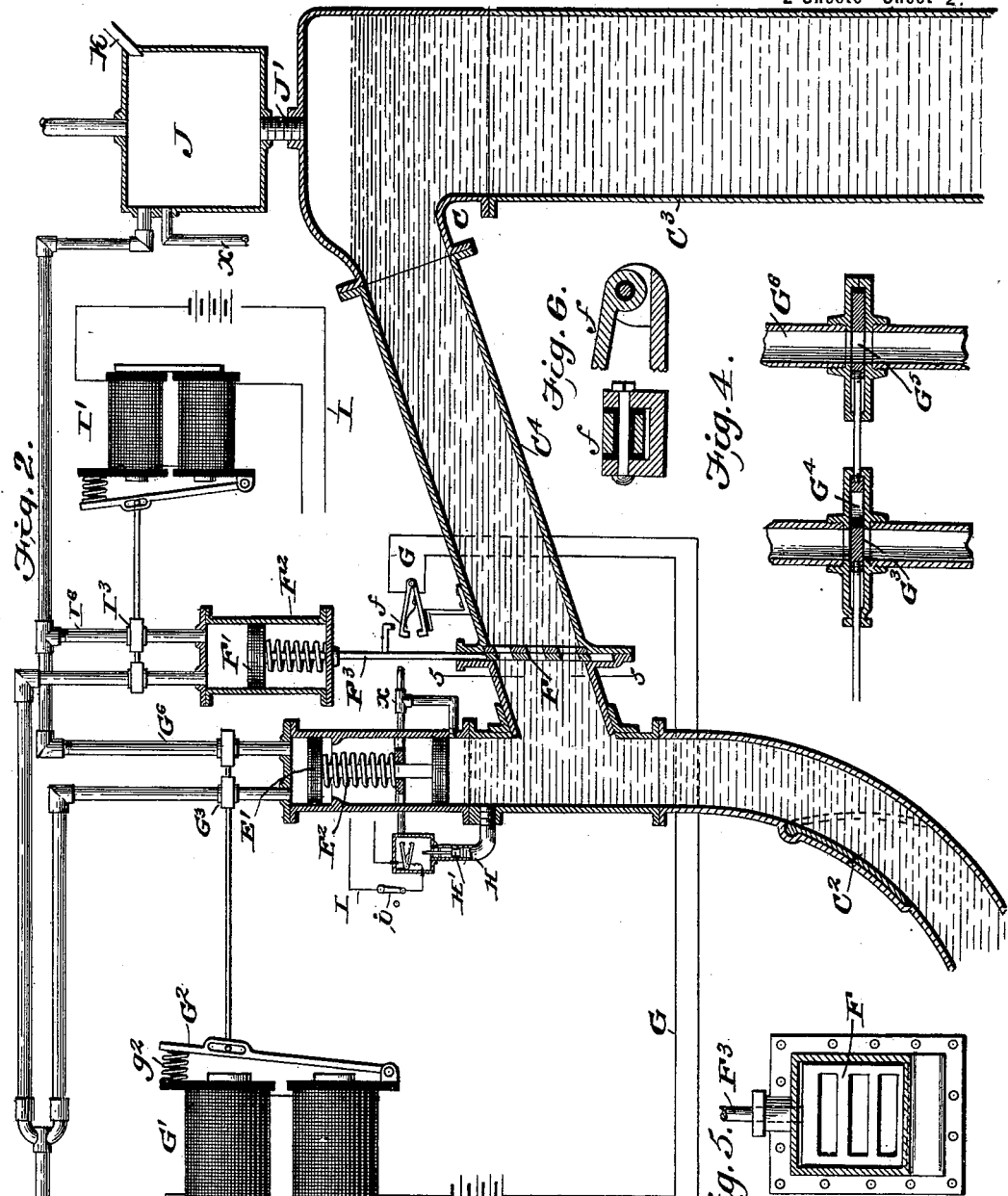
WITNESSES: 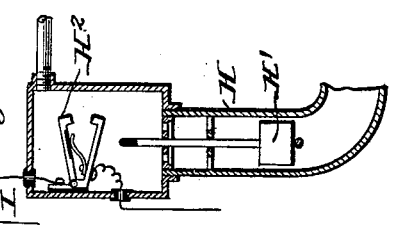 INVENTOR
John E. Tyler.
BY
ATTORNEYS.
THE NORRIS PETERS CO., PHOTO-LITHO., WASHINGTON, D. C.

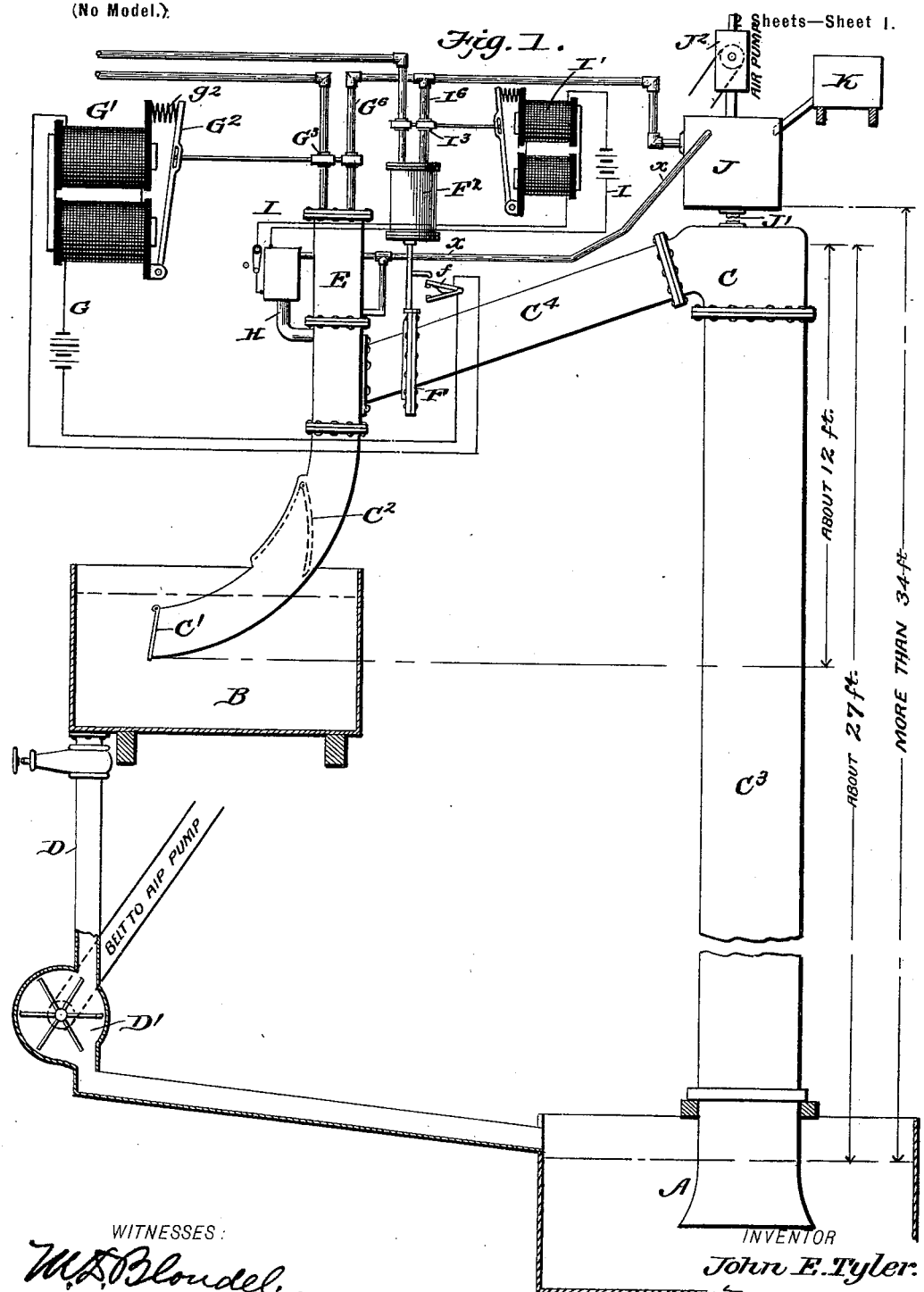

UNITED STATES PATENT OFFICE.

JOHN E. TYLER, OF ROXOBEL, NORTH CAROLINA.

MOTOR APPARATUS.

SPECIFICATION forming part of Letters Patent No. 631,238, dated August 15, 1899.

Application filed June 6, 1898. Serial No. 682,719. (No model.)

*To all whom it may concern:*

Be it known that I, JOHN E. TYLER, residing at Roxobel, in the county of Bertie and State of North Carolina, have made certain new and useful Improvements in Motor Apparatus, of which the following is a full, clear, and exact specification.

My invention is an improvement in motor apparatus, and embodies a series of tanks or reservoirs, connecting-pipes, and pumping and driving mechanism whereby a circulation of water from tank to tank will effect the continuous operation of the operating devices and a readjustment of water from tank to tank to effect the desired operation of the parts.

The invention consists in certain novel constructions and combinations of parts, as will be hereinafter described, and pointed out in the claims.

In the drawings, Figure 1 is a sectional elevation of an apparatus embodying my invention. Fig. 2 is an enlarged detail view showing a portion of the apparatus. Fig. 3 is a detail sectional view illustrating the float and circuit-closer operated thereby. Fig. 4 is a detail sectional view illustrating the slide-valve controlling the steam-ports. Fig. 5 is a detail view, and Fig. 6 is a detail view illustrating the means for insulating the members of the circuit-closer from each other.

In carrying out my invention I provide tanks A and B, which may be referred to, respectively, as the "main" or "supply" tank A and the "discharge-tank" B, and between such tanks I provide a connecting-pipe C, whose opposite ends open into the tanks A and B below the level of the water in said tanks, the end opening into the tank A being unvalved, while that opening into the tank B has a check-valve C', which permits the flow of water from the pipe into the tank, but prevents any flow of water from the tank B into the pipe, as will be understood from Fig. 1. I also prefer to provide a second check-valve $C^2$, opening in the same direction as and arranged a short distance above the valve C'.

It should be noted that the tank B is arranged above the tank A, and that a pipe D leads from the tank B to discharge into the tank A, and that a water-wheel D' or similar power is arranged for operation by the water flowing from the tank B to the tank A.

The pipe C has the vertical branch $C^3$, extending upward from the tank A usually to a height about twenty-seven feet above the level of water in the tank A and connecting at its upper end with a downwardly inclined or curved branch $C^4$, which discharges at C' into the tank B. The cylinder E connects with the branch $C^4$, and in such branch in advance of the cylinder E, I arrange the valve F (shown in detail in Fig. 5) and controlling the passage of the water through the branch $C^4$. This valve F is arranged to close by a slight movement and is operated by a piston F' in a cylinder $F^2$, the piston-rod $F^3$ connecting with the valve F, as shown. The movement of the valve F makes and breaks an electric circuit G, preferably by means of the mechanism shown at *f* in Figs. 1 and 2, so that the valve F when closed will close the circuit G and energize an electromagnet G', and the latter will attract its armature $G^2$, which is connected with the valve $G^3$ and opens the port $G^4$, admitting steam to the cylinder E above the piston E', operating such piston downwardly against the action of its spring $E^2$, which spring tends to return the piston when the valve $G^3$ is readjusted to close the feed-port $G^4$ and open the exhaust-port $G^5$, which occurs when the circuit G is open and the armature $G^2$ is released from its magnet and actuated by the spring $g^2$. The members of the circuit-closer *f* may be insulated from each other in any desired manner familiar to those skilled in the art. A float-chamber H connects with the pipe connection C below the piston E' and contains a float H', which is lifted by the water to operate a circuit-closer $H^2$, which makes and breaks an electric circuit I, which includes an electromagnet I', which operates the slide-valve $I^3$, controlling the supply and exhaust of steam to the cylinder $F^2$, and which valve may be constructed and operated similarly to the valve $G^3$, which is shown in detail in Fig. 4.

The exhaust-pipes $G^6$ and $I^6$ discharge into a vacuum-chamber J, which connects at J' with the upper end of the pipe connection C and may be connected with a suitable supply of cold water at K to condense the exhaust-steam in the vacuum-chamber. This vacuum-chamber J is connected with an air-exhausting pump J², which may be suitably connected by belts or otherwise with the shaft of the wheel D'.

In the operation of the described construction the pipe C should be filled with water by exhausting air at the upper portion of said pipe, the tanks A and B being also filled with water. When this is done, the water will lift the float H', close the circuit I, and the magnet I' will be energized, opening the steam-pipe leading to cylinder F², and the piston F' will be operated to close the valve F. As the valve F closes it will close the electric circuit G at $f$ and the magnet G' will be energized and its armature will open the valve G³ to admit steam to cylinder E above the piston E'. The piston E' will then be given a sharp downward stroke and will force the water below it out into the tank B. The sharp downward stroke of the piston E' operates to give considerable momentum to the water below it, and consequently when the piston E' reaches the end of its stroke the water below it continues to move until its momentum is overcome by atmospheric pressure acting on the water in tank B and, through the medium of the water in tank B, closing the valve at the lower end of the pipe that discharges into tank B. As the water under piston E continues to move after piston E' has completed its stroke until the momentum of such water is overcome, as above stated, a vacuum will be formed under piston E'. When this vacuum is formed, the water passes out from below float H' into said vacuum. As the water passes out from below the float H' the latter will fall and the circuit I will be broken and the armature of magnet I' will be released and the feed-port of cylinder F² will be closed and the exhaust-port opened, so the piston F' will be lifted by its spring and the valve F will open to permit the water to flow from above it into the pipe below. As the valve F opens the circuit G will be broken and the valve G³ will be operated to close its feed-port and open its exhaust-port. As the water passes into the space below the valve F it will rise and operate the float H' to close the circuit I, and the operation will proceed as before.

Pipes are provided at $x$, leading to the vacuum-chamber J, to carry off any air that may escape from the water as it passes from the lower end of the pipe connection C.

The circuit I is provided with any ordinary form of hand-operated circuit maker and breaker, as $i$, for use in stopping and starting the apparatus. Usually the steam-pipes to cylinders E and F² merge in a main pipe in connection with the boiler, and a suitable throttle is provided at $i'$.

Having thus described my invention, what I claim, and desire to secure by Letters Patent, is—

1. The combination substantially as described of the main tank, the discharge-tank, the pipe connection, the valve controlling same, a cylinder and piston for operating said valve, a cylinder in connection with the pipe connection and having a piston, valves controlling the passage of power to said cylinders and electromagnets and their circuits for operating said valves substantially as set forth.

2. In an apparatus substantially as described the combination with the pipe connection having a cylinder and piston operating therein to impart an impulse to the water in the discharge end of said connection, the valve controlling the connection in advance of said cylinder, electrically-operating devices for operating the feed-valve of said cylinder, means whereby the movement of the valve in the pipe connection makes and breaks the circuit of said electrical devices, and means for operating said valve substantially as set forth.

3. In an apparatus substantially as described the combination with the pipe connection and the valve controlling the same, of the cylinder and piston for operating said valve, electrically-operated devices for controlling supply of power to said cylinder, and a float operated by the liquid in said pipe connection and means whereby said float may make and break the circuit of said electrically-operated devices substantially as set forth.

4. In an apparatus substantially as described the combination of the pipe connection having a cylinder and piston operating therein, a valve controlling such connection in advance of such piston, means whereby such controlling-valve closes an electric circuit, a magnet in such circuit, means whereby such magnet may operate to control the passage of power to the said cylinder, a cylinder and piston for operating the controlling-valve, an electromagnet and devices whereby such magnet controls the passage of power to the latter cylinder, an electric circuit including the last-named magnet and a maker and breaker for such circuit including a float arranged for operation by the fluid in the pipe connection substantially as set forth.

5. The herein-described apparatus comprising the main tank, the discharge-tank, the pipe connection between said tanks, a valve controlling such pipe connection, means for imparting motion to the fluid in such pipe connection between the controlling-valve and the discharge-tank, a vacuum-chamber in connection with the upper portion of the pipe connection, electrically-operated devices for controlling the movements of the controlling-valve and the means for imparting motion to the fluid in the pipe connection, and automatically-operating circuit-closing devices all substantially as set forth.

JOHN E. TYLER.

Witnesses:
SOLON C. KEMON,
PERRY B. TURPIN.